Patented Dec. 13, 1927.

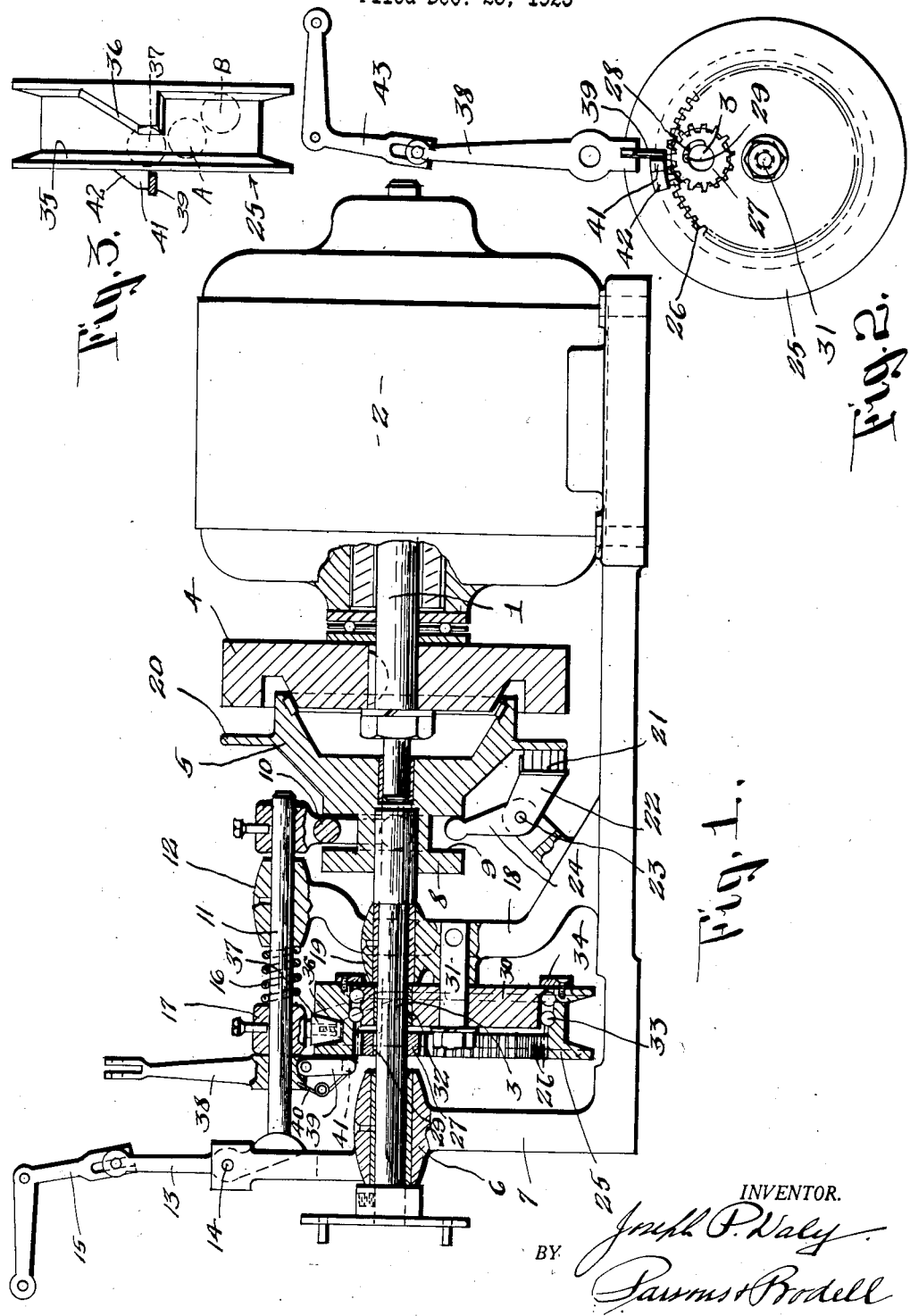

1,652,704

UNITED STATES PATENT OFFICE.

JOSEPH P. DALY, OF SYRACUSE, NEW YORK, ASSIGNOR TO THE PROSPERITY COMPANY INC., OF SYRACUSE, NEW YORK, A CORPORATION OF NEW YORK.

CLUTCH CONSTRUCTION.

Application filed December 23, 1925. Serial No. 77,341.

This invention relates to clutch construction and particularly to a construction by which a periodic clutch can be applied to an electric motor so that the electric motor, the clutch mechanism, and the means by which the periodic operation or throwing out of the clutch is automatically controlled, are combined in a unitary structure.

The invention consists in the novel features and in the combinations and constructions hereinafter set forth and claimed.

In describing this invention reference is had to the accompanying drawings in which like characters represent corresponding parts in all the views.

Figure 1 is a longitudinal sectional view of this clutch mechanism.

Figure 2 is a detailed elevation of the controller.

Figure 3 is an edge view of the controller cam.

This mechanism is generally the same as that of my pending application Sr. No. 74.269, filed December 9, 1925.

In my pending application, the operation of the clutch is controlled by a driven shaft which makes a half revolution during each operation or a driven shaft actuated through reduction gearing. In my present invention the clutch mechanism is controlled by a shaft forming an extension of the motor shaft and rotatable at the same speed as the motor shaft, and is operable to throw out the clutch when the motor shaft has made a predetermined number of revolutions as fifteen in contradistinction to a half revolution as in my copending application.

This clutch mechanism comprises, generally, a motor having a driving shaft, a driven shaft arranged in axial alinement with the motor and mounted as a unit with the motor, a clutch connecting said shafts including sections one of which is shiftable, means for shifting the clutch section into engaged position and means for automatically throwing the clutch section out of engaged position after the shafts have made a plurality and a predetermined number of revolutions.

1 designates the driving or armature shaft of an electric motor 2.

3 is a driven shaft arranged in alinement with the shaft 1.

4 and 5 are respectively clutch sections rotatable with the shafts 1 and 3, they being here shown as mounted on said shafts and one of these sections preferably the driven section 5 on the shaft 3, being splined on said shaft and slidable axially thereof. The clutch here shown is of the friction cone type and the clutch section 4 is formed on the fly wheel of the motor.

The shaft 3 is journaled in a bearing 6 formed in a support 7, which is a unit with the support for the motor 2, and as here shown the support 7, is a base common to, or secured to, the base of the motor, so that the driving and driven shafts 1 and 3 and the clutch mechanism are a unitary structure.

The shiftable clutch section 5 has a hub 8 splined to the shaft 3, and this hub is formed with a circumferential groove 9 for receiving a shifting fork 10, which is operated by means of a shifter rod 11 slidable in a suitable guide 12 and operable by means of a lever 13 pivoted at 14 to the support 7. The lever is pivoted between its ends and has one arm thereof pushing against the rod 11, and the other arm connected to a suitable handle through suitable motion transmitting connections including a bell crank lever 15. A compression throwout spring 16 is interposed between the guide 12 and the collar 17 on the rod; this spring tending to thrust the rod 11 in such direction as to carry the clutch section 5 to its out position.

The guide 12 is carried by a suitable bracket 18 rising from the support or base 7, which bracket also has a journal bearing 19 for the shaft 3.

Suitable brake means is provided for coacting with the clutch section 5 or a flange 20 thereon to stop the rotation of the shaft 3 when the clutch section 5 is disengaged from the section 4. This brake is here shown as a shoe 21 carried by a lever 22, pivoted at 23 to the support 7 and having an arm 24 extending into the groove 9 in the hub 8 of the clutch section 5. During the movement of the clutch section 5 to its disengaged position, the flange 20 moves toward the brake shoe 21 and also, owing to the lever 24 the brake shoe moves toward the flange and thus quickly stops the clutch section 5 and the shaft 3 as soon as the clutch is disengaged.

The controller comprises a cam ring 25 having internal gear teeth 26 meshing with the pinion 27 mounted on the shaft 3, and rotatable therewith, and means for transferring the motion of the cam to the fork 13, and also means for initially actuating the cam to unlock the clutch shifting mechanism so that it can be actuated by the lever 13. The pinion 27 is shown as connected to the shaft to rotate therewith but by a lost motion connection which permits the pinion and hence the cam to be rotated in advance of the shaft 3, this lost motion connection being provided by forming a wide keyway 28 in the pinion for receiving a narrow key 29 on the shaft.

This cam ring 25 is mounted eccentrically relatively to the shaft 3 and as here shown is mounted on a hub 30 carried by a pin 31, supported in the bracket 18 below the shaft 3, the hub 30 having a hole through which the shaft 3 extends, this hole being provided with a suitable bushing at 32. Antifriction bearings 33 are interposed between the hub and the cam ring, and the cam ring and the antifriction bearings are held assembled on the hub 30 by a ring 34.

The cam 25 is shown as provided with groove 35 having a lift or cam point 36 projecting from one side thereof and the shifter rod 11 has a follower extending into the cam groove, this follower being designated 37 and being carried by the collar 17. The follower 37 normally stands on the end of the cam point 36 so that the shifting of the shifter rod 11 to carry the clutch section 5 into engagement with the clutch section 4 is normally prevented and the cam must be shifted to carry the point 36 out from under the follower in order to permit the operation of the rod 11 by the manually operated lever 13. This shifting is effected by means of a lever 38 pivoted on the rod 11 and having a pawl 39 at its lower end mounted to swing outwardly or to the left on its pivot, Figure 1, against the action of returning spring 40, and this pawl coacts with a shoulder 41 on one side of the cam ring 25. The shoulder has an inclined face 42 on one side thereof. This lever 38 is actuated by a suitable handle not shown through a bell crank lever 43. Upon the actuation of the lever 43, the pawl 39 engaging the shoulder 41 moves the cam about its axis, such movement being permitted by the wide key way 28 in the pinion 27. Such preliminary movement moves the cam so that the follower instead of being opposite the point of the cam is in the dotted line position A shown in Figure 3. Now upon the operation of the lever 13, the shifter rod 11 is shifted to carry the fork 10 to the right moving the clutch section 5 into engagement with the clutch section 4, the follower moving from the dotted line position "A" Figure 3 to the dotted line position "B" Figure 3, and as long as the operator retains his hold on the handle, the clutch section 5 will be held in its engaged position against the action of the spring 16 tending to throw the clutch out. When the driven shaft 3 has made a predetermined number of revolutions, say fifteen, the lift portion of the cam point 36 engages the follower and forces the follower back, to its original or starting position, thus throwing out the clutch. During such movement the cam face 42 of the shoulder 41 passes under the pawl 39 and ratchets past it, so that the parts are restored to their initial position.

This clutch construction is particularly advantageous in that its control mechanism is a unit with the motor, and independent of the mechanism driven by the motor.

What I claim is:—

1. The combination of driving and driven shafts arranged in axial alinement, a periodic clutch connecting said shafts including sections rotatable respectively with the shafts, one section being shiftable into and out of engagement with the other, means for shifting the shiftable clutch section into engaged position, means tending to shift it out of engaged position, a pinion mounted on the driven shaft and rotatable therewith, and connected to the shaft by a lost motion connection whereby the pinion has a limited rotary movement about the shaft, a controller having internal teeth meshing with the pinion and connections between the controller and the clutch shifting means, and operator operated means for initially shifting the controller out of its initial position, and thereby turning the pinion about the shaft.

2. The combination of driving and driven shafts, arranged in axial alinement, a periodic clutch connected to said shafts including sections rotatable respectively with the shafts, one section being shiftable into and out of engagement with the other, means for shifting the shiftable section into engaged position, means tending to shift it out of engaged position, a pinion mounted on the driven shaft, a controller connected to the clutch shifting means for moving the shiftable clutch section to its disengaged position after the driven shaft has made a predetermined plural member of revolutions, the controller having a gear meshing with the pinion, manual means for turning the controller relatively to said shaft thereby permitting the shiftable clutch section to be shifted into engaged position.

3. The combination of driving and driven shafts, a periodic clutch connected to said shafts including sections rotatable respectively with the shafts, one section being shiftable into and out of engagement with the other, means for shifting the shiftable section into engaged position, means tending to shift it out of engaged position, a pinion mounted on the driven shaft and connected thereto by a limited lost motion connection, a controller connected to the clutch shifting means for shifting the shiftable clutch section to its disengaged position after the driven shaft has made a predetermined plural number of revolutions, the controller having a gear meshing with the pinion, and manual means for turning the controller out of its normal position and thereby permitting the shiftable clutch section to be shifted into engaged position, the controller turning said pinion about the shaft, and the lost motion between the shaft and the pinion permitting such turning of the controller.

4. The combination of driving and driven shafts, arranged in axial alinement, a periodic clutch connected to said shafts including sections rotatable respectively with the shafts, one section being shiftable into and out of engagement with the other, means for shifting the shiftable section into engaged position, means tending to shift it out of engaged position, a pinion mounted on the driven shaft and connected thereto by a limited lost motion connection, a controller connected to the clutch shifting means for shifting the clutch section to its disengaged position after the driven shaft has made a predetermined plural number of revolutions, the controller having a gear meshing with the pinion, manual means for turning the controller relatively to said shaft thereby permitting the shiftable clutch section to be shifted into engaged position, the controller having a groove and a cam point therein and the clutch shifting means having a follower in the groove normally arranged opposite the high point of the cam whereby the cam holds the shiftable clutch section in its out position.

5. The combination of driving and driven shafts arranged in axial alinement, a periodic clutch connecting said shaft including sections rotatable respectively with the shafts, one section being shiftable into and out of engagement with the other, means for shifting the shiftable clutch section into engaged position, means tending to shift it out of engaged position, a pinion mounted on the driven shaft and rotatable therewith, and connected to the shaft by a lost motion connection whereby the pinion has a limited rotary movement about the shaft, a controller having internal teeth meshing with the pinion, the controller also having a peripheral groove and a cam point projecting into the groove and said clutch shifting means having a follower extending into the groove and normally engaging the end of the cam point, and means for normally shifting the controller out of its initial position, and thereby turning the pinion about the shaft.

In testimony whereof, I have hereunto signed my name, at Syracuse in the county of Onondaga, and in the State of New York, this 17th day of December, 1925.

JOSEPH P. DALY.